US012710749B2

(12) United States Patent
Cui et al.

(10) Patent No.: US 12,710,749 B2
(45) Date of Patent: Aug. 18, 2026

(54) METHOD AND APPARATUS FOR COMMISSIONING ARTIFICIAL INTELLIGENCE-BASED INSPECTION SYSTEMS

(71) Applicant: Siemens Aktiengesellschaft, Munich (DE)

(72) Inventors: Tao Cui, Princeton Junction, NJ (US); Lingyun Wang, Princeton, NJ (US); Fernando Garcia-Perez, Park Ridge, IL (US); Alessandra Oliveira Da Silva, Atlanta, GA (US)

(73) Assignee: Siemens Aktiengesellschaft, Munich (DE)

( * ) Notice: Subject to any disclaimer, the term of this patent is extended or adjusted under 35 U.S.C. 154(b) by 314 days.

(21) Appl. No.: 18/551,452

(22) PCT Filed: Jul. 14, 2021

(86) PCT No.: PCT/US2021/041520
§ 371 (c)(1),
(2) Date: Sep. 20, 2023

(87) PCT Pub. No.: WO2023/287406
PCT Pub. Date: Jan. 19, 2023

(65) Prior Publication Data
US 2024/0168470 A1 May 23, 2024

(51) Int. Cl.
*G05B 19/418* (2006.01)

(52) U.S. Cl.
CPC ... *G05B 19/41885* (2013.01); *G05B 19/4183* (2013.01)

(58) Field of Classification Search
None
See application file for complete search history.

(56) References Cited

U.S. PATENT DOCUMENTS 10,984,257 B2 4/2021 Englard et al.
2015/0248755 A1* 9/2015 Vagman .......... G05B 19/41875 382/103

(Continued)

FOREIGN PATENT DOCUMENTS

CN 111598169 A 8/2020
CN 112183577 A 1/2021

(Continued)

OTHER PUBLICATIONS

Samsung, "Samsung Electronics to Strengthen its Neural Processing Capabilities for Future AI Applications", Jun. 2019, Samsung Newsroom, p. 1 (Year: 2019).*

*Primary Examiner* — David Earl Ogg

(57) ABSTRACT

Described embodiments provide a technique for commissioning an AI-based inspection system. In particular, the described embodiments provide a tool for field engineers to perform tasks including data collection, and training, testing and deployment of an AI algorithm, onsite, with instant feedback. The described tasks are carried out in the same physical environment to arrive at the same sensor setting that is then used by the field device on which the AI algorithm is deployed. Deployment cycle is significantly reduced. The technique leverages the recognition that inspection tasks in industrial settings are repetitive in nature and are carried out in a controlled environment, whereby the AI algorithm need not be generalized beyond the specific use case.

15 Claims, 3 Drawing Sheets

(56) References Cited

U.S. PATENT DOCUMENTS

| | | | | |
|---|---|---|---|---|
| 2017/0270406 | A1* | 9/2017 | Visser | G06N 3/045 |
| 2020/0050965 | A1* | 2/2020 | Harvill | G06N 5/04 |
| 2020/0209858 | A1 | 7/2020 | Trofymov et al. | |
| 2021/0120731 | A1 | 4/2021 | Mota Manhaes et al. | |
| 2021/0133607 | A1 | 5/2021 | Stubbs et al. | |
| 2021/0248427 | A1* | 8/2021 | Guo | G06V 10/82 |
| 2021/0374477 | A1* | 12/2021 | Kim | G06V 10/776 |
| 2022/0083855 | A1* | 3/2022 | Choi | G06N 3/08 |
| 2022/0157138 | A1* | 5/2022 | Metzler | G08B 13/19613 |

FOREIGN PATENT DOCUMENTS

| | | | |
|---|---|---|---|
| CN | 113095350 | A | 7/2021 |
| JP | 2019184305 | A | 10/2019 |
| WO | 2019118542 | A2 | 6/2019 |
| WO | 2020082382 | A1 | 4/2020 |
| WO | 2021086330 | A1 | 5/2021 |

* cited by examiner

Figure 1:
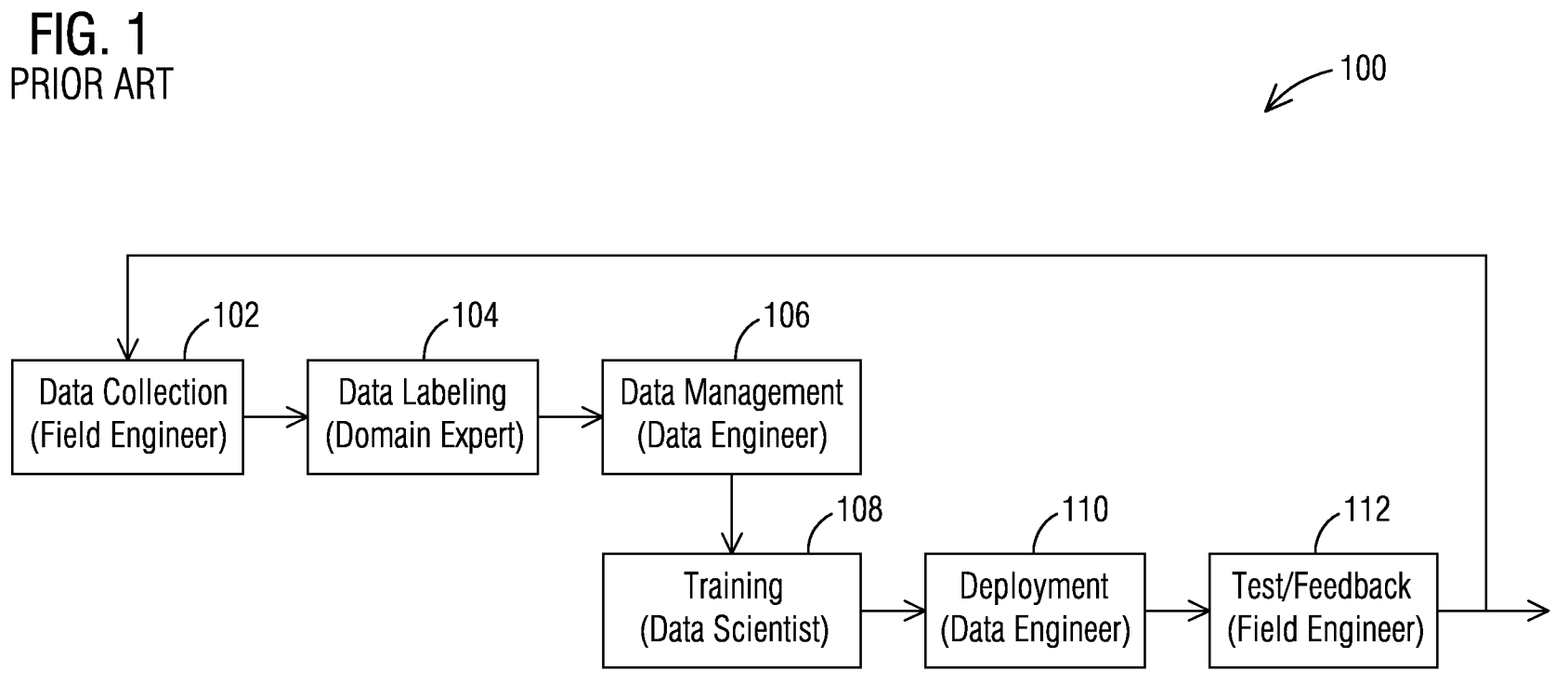

100

102 Data Collection (Field Engineer)

104 Data Labeling (Domain Expert)

106 Data Management (Data Engineer)

108 Training (Data Scientist)

110 Deployment (Data Engineer)

112 Test/Feedback (Field Engineer)

Figure 2:
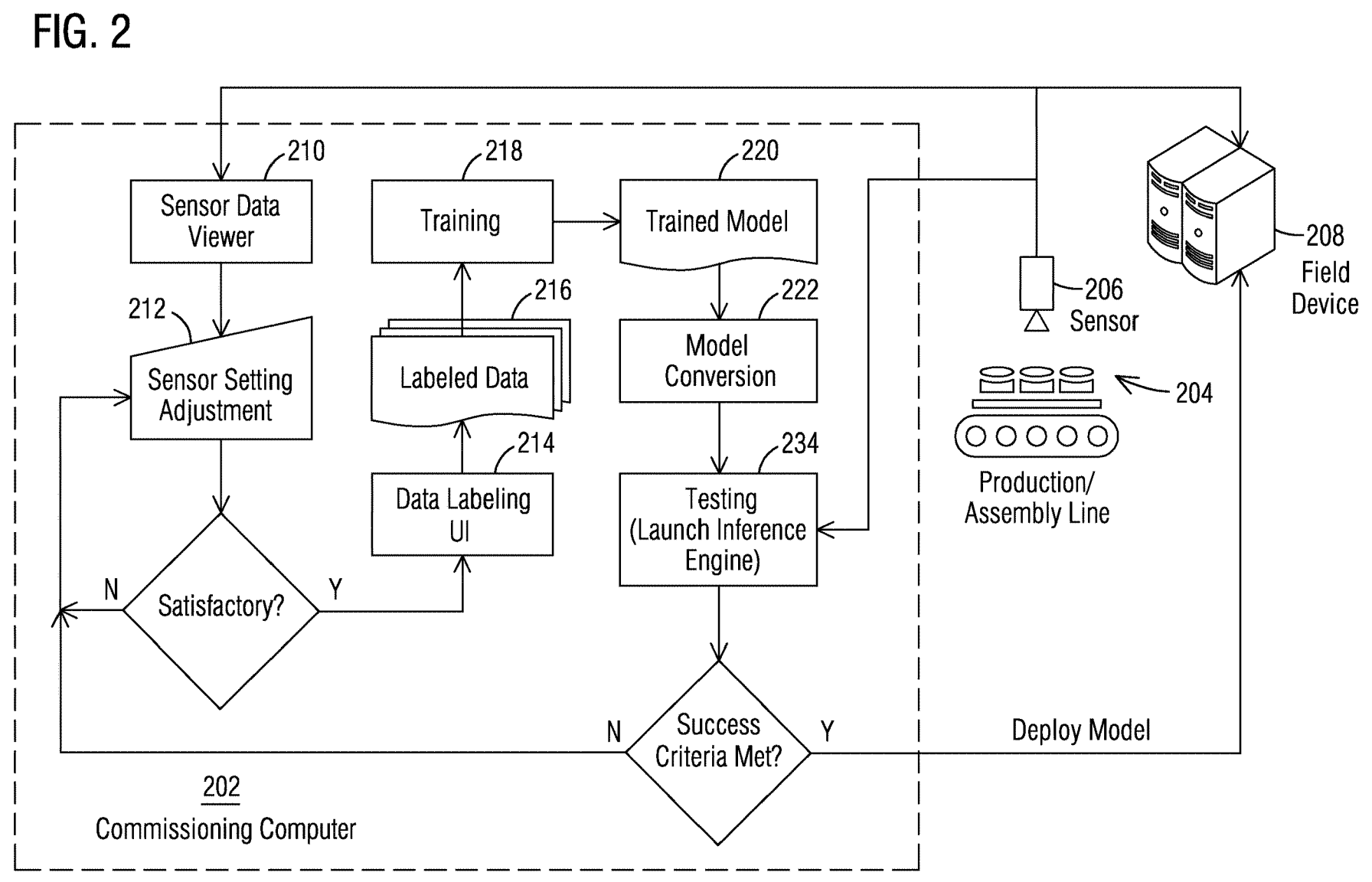

208 Field Device

206 Sensor

204

Production/ Assembly Line

Deploy Model

210 Sensor Data Viewer

212 Sensor Setting Adjustment

Satisfactory?

Y

N

214 Data Labeling UI

216 Labeled Data

218 Training

220 Trained Model

222 Model Conversion

234 Testing (Launch Inference Engine)

Success Criteria Met?

Y

N

202 Commissioning Computer

Computer System
302
System Memory
308
ROM
BIOS
RAM
Operating System
Application Programs
Other Program Modules
Program Data
310
314
312
316
318
320
322
Hard Disk
326
Removable Media Drive
328
Processors
306
Disk Controller
324
System Bus
304
Display Controller
330
User Input Interface
334
Network Interface
345
I/O Adapter
346
Display
332
Pointing Device
338
Keyboard
336
Modem
342
Network
340
Sensor
348
Remote Computing Device
344
300

METHOD AND APPARATUS FOR COMMISSIONING ARTIFICIAL INTELLIGENCE-BASED INSPECTION SYSTEMS

TECHNICAL FIELD

The present disclosure relates to commissioning of artificial intelligence (AI) systems in the field. Described embodiments are suitable, in particular, for commissioning AI systems capable of carrying out repetitive inspection tasks in an industrial environment.

BACKGROUND

AI algorithms are typically trained on a large amount on data with the objective of generalizing to multiple use cases. For example, an AI-based object detection algorithm for detecting a car in an image may be trained with a large amount of data pertaining to different type of cars produced by different car makers, with the goal that the trained model is useable in many general use cases. Likewise, an AI-based algorithm used for product inspection may be trained to target a wide range of products and features. Often, the training and tuning of such AI algorithms is an iterative process, which is time consuming, involving multiple resources, in terms of personnel, software and hardware.

SUMMARY

Briefly, aspects of the present disclosure are concerned with the commissioning and deployment of an AI-based inspection system in the field, with a focus on shortening the workflow/process cycle to provide instant feedbacks to re-train and tune the AI algorithm to achieve the optimal performance for a specific use case.

According to a first aspect of the disclosure, a method is provided for commissioning an AI-based inspection system. The method comprises (i) receiving, by a commissioning computer, sensor data captured by a sensor, the sensor positioned within a physical environment to capture sensor data pertaining to individual items in a sequence of similar items, (ii) collecting, by the commissioning computer, a plurality of data samples, wherein collecting each data sample comprises providing an operator interface for a field operator to access sensor data pertaining to individual items and thereto assign classification labels, the collected data samples corresponding to a fixed setting of the sensor, (iii) training, by the commissioning computer, an AI algorithm using the collected data samples to configure the AI algorithm to predict classification labels from input sensor data, and (iv) testing, by the commissioning computer, the trained AI algorithm by feeding the trained AI algorithm with real-time sensor data captured by the sensor positioned within said physical environment with said fixed setting. Steps (ii) through (iv) are performed iteratively using different fixed settings of the sensor, to determine a final setting of the sensor for which a defined success criterion is achieved during the testing. The method further comprises (v) deploying the iteratively trained and tested AI algorithm to a field device, the field device being coupled to the sensor configured with the final setting to provide sensor data as input to the deployed AI algorithm.

Other aspects of the present disclosure implement features of the above-described methods in a computer program product and a computing apparatus.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

FIG. 1 is a schematic diagram illustrating an example of a known process flow for deployment of an AI system in the field.

FIG. 2 is a schematic diagram illustrating a methodology for commissioning and deployment of an AI-based inspection system in the field, according to an example embodiment of the disclosure.

DETAILED DESCRIPTION

Figure 3:
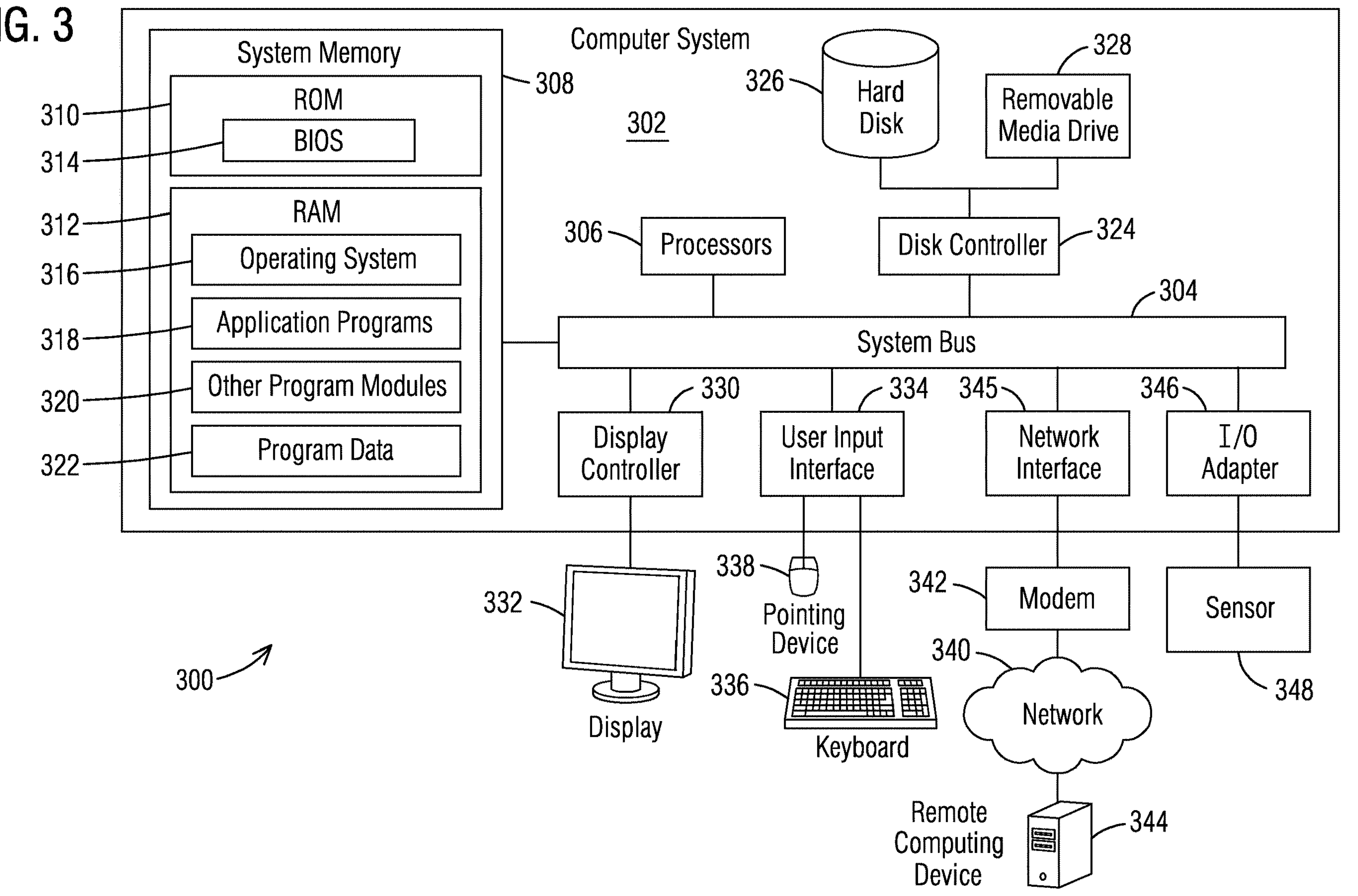
FIG. 3 illustrates an exemplary computing environment where aspects of the present disclosure may be embodied.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

It is recognized that many artificial intelligence (AI) algorithms are not directly usable out-of-the-box and must be re-trained and tuned for particular use cases using the data from the actual case. For example, an AI algorithm can include a neural network-based object detection method that uses a camera to visually detect and locate defects on products on a production or assembly line. Typically, the algorithm will begin with a pre-trained neural network. The subsequent re-training process may involve collecting images of specific product or products and labelling identified defects on the images, and then providing those images with labels as training data to re-train the neural network. The re-trained neural network is then tested on a testing dataset. Based on the results obtained from testing (e.g., success or quality of inferences), the training or data collection process is tuned to improve the performance until the testing results satisfy a defined requirement. After successful re-training and testing, the AI algorithm is deployed for operation in the field.

FIG. 1 illustrates an example of a known process 100 for deployment of an AI system in the field. The described process 100 includes: data collection by field engineers (block 102), including data collected from multiple use cases (e.g., multiple fields, multiple machines, etc.); data labeling by domain experts (block 104); data management by data engineers (block 106), which includes, for example, transfer of data to a cloud; training an AI algorithm, such as a neural network, by data scientist (block 108), which is often carried out in a cloud computing environment; and deployment of the AI algorithm back to the field (block 110) to get feedback from field engineers (block 112). Based on the feedback (block 112), multiple iterations of re-training may be carried out until the AI algorithm is ready to be deployed in the field.

The above-described process provides a systematic approach targeting a wide range of use cases, with clearly defined roles and responsibilities. The underlying thinking here is that each role has its specialty and can hence fully the contribute to achieve the best results. For example, it is convenient to store the data and train the neural network in a cloud, as the cloud can hold vast amount of data and provides large computational resources.

However, in many applications, the above-described process may pose practical challenges. First, the process involves a long iteration loop across multiple (sometimes disconnected) modules. In a typical deployment use case, many iterations may be necessary over this long loop to deliver a usable solution. In that case, the above-described process may significantly increase the time and cost. Next, the above-described process does not provide instant feedback on test results. Preferrably, the field engineer would like to use the results right on the spot, to determine how to tune the sensors and how to re-collect the label data. In the above-described process, the field engineer may have to wait for the entire loop to complete to determine the next step, which makes the task infeasible to complete. Furthermore, if there is any difference in setup for each step, this can lead to challenges in obtaining successful inferences from the AI algorithm. For example, if the data used to train the AI algorithm has been converted to another format in the cloud with some loss of information, this may cause some differences with the actual data obtained from the sensor, causing the AI algorithm to fail. Other potential hurdles include cross-organization data privacy and sharing, cyber security, among others.

Overall, the long loop in the above-described process increases the cost, lacks instant feedback, and can cause differences in data, all of which can lead to a sub-optimal setup for deploying AI algorithms in the field. Addressing this sub-optimal setup while still delivering good results is a challenging research topic. For example, there is ongoing research focusing on how to train an AI algorithm or model on one type of data and ensure that it can be generalized to other types of data. However, as of the present, those approaches still have a low level of readiness to be practically implemented.

Embodiments of the present disclosure are concerned with a technique for commissioning an AI-based inspection system in the field, with a focus on shortening the process cycle by providing on-the-spot feedbacks to tune and retrain an AI algorithm, and with a goal of achieving an optimal performance for a specific use case. In one aspect, the proposed solution may be embodied in a software suite comprising a tool for field engineers to handle the entire AI pipeline including data collection, training, testing and tuning in a single commissioning device (computer). In embodiments, the commissioning device may be located onsite, providing an "on premise" solution for implementing the AI pipeline. This is particularly useful in many cases where, due to restrictions on communication or data sharing, it may not be possible for a field engineer to have access to the Internet or other external networks during the deployment or to share the data outside the facility.

The proposed solution is based on the recognition that in some real-world applications, especially in the manufacturing domain, many of the machine learning inspection tasks are repetitive, on the same type of product, and carried out in a controlled environment. For example, in a production or assembly line, the "good" products are all nearly identical, the "defects" are also same or similar, the products are positioned in the same orientation or pose on the product line, the inspection station on the same product-line has nearly the same controlled lighting condition at all times, etc. In the traditional approach (shown in FIG. 1), the training process for an AI model typically tries to generalize, for example, to avoid overfitting. This requires a large amount of data and may further necessitate data augmentation and other training techniques. The goal of the training process is that the AI model, once trained, can be used in many general cases, not just the cases close to the training scenario. However, for one or more of the reasons noted above, in a repetitive inspection task, especially in the manufacturing domain, it may not be necessary to generalize the model training process beyond the specific use case in which the AI model is intended to be deployed. As a consequence, the size of the training dataset may be greatly reduced and the process cycle for deployment may be significantly shortened. The proposed solution leverages the above finding by using a "single box" commissioning device to train an AI model at the same site, and with the same environmental and sensor settings, as where the AI model is tested and finally deployed, to deliver a successful AI solution meeting the constraints of cost and time.

FIG. 2 illustrates a methodology for commissioning and deployment of an AI-based inspection system in the field, according to an example embodiment. As mentioned, the methodology is implemented via a commissioning computer, which is represented schematically in FIG. 2 by the dashed box 202. The commissioning computer may comprise a PC (desktop, a laptop) or any other computing device having at least one processor and a memory storing instructions that, when executed by the processor, cause the computing device to execute an AI pipeline. For illustration, the functional blocks of the described AI pipeline that are executed via the commissioning computer are located within the dashed box 202.

While the described embodiment illustrates a particular application of the proposed solution, namely, fault detection and classification in a production/assembly line, the general teachings of this disclosure can be extended to other factory tasks, such as identifying presence or location of objects, detecting physical properties of objects, among others.

During the commissioning and deployment phase, the commissioning computer 202 may be located within the premises of an industrial facility where the AI-based inspection system is to be deployed. The industrial facility may comprise a production facility including a physical environment 204 within which a sensor 206 is positioned to capture sensor data pertaining to individual items in a sequence of similar items to be inspected. In embodiments, the physical environment 204 may comprise a production line or an assembly line. The term "similar items" refers to items having the same design but with the potential of having defects or faults, for example, resulting from the production or assembly process.

The sensor 206 is connected to a field device 208 where a deployed AI algorithm is to be executed. The field device 208 may comprise a field controller, such as a programmable logic controller, an industrial PC, an industrial edge computer, among others. In one embodiment, the field device 208 may comprise one or more neural processing unit (NPU) modules. An NPU comprises dedicated edge AI hardware which may be custom designed to run a neural network in a computationally efficient fashion.

For the training and testing process, the commissioning computer 202 uses sensor data from the same sensor 206 that would feed the field device 208 during actual operation.

Inspection tasks the production/assembly line (such as detection of faults or defects) may carried out based on visible features, acoustic anomalies or changes in vibration characteristics. In the described example, the sensor 206 includes a vision camera (e.g., a gigabyte ethernet camera) mounted at a preferred location on the production/assembly line, and configured to transmit a video stream to the commissioning computer 202 (during commissioning) and to the field device 208 (after deployment). In other embodiments, the sensor 206 may include an acoustic sensor, such as a microphone, configured to transmit an audio stream to the commissioning computer 202 (during commissioning) and to the field device 208 (after deployment). In still other embodiments, the sensor 206 may comprise a vibration sensor, such as a piezoelectric sensor. In further embodiments, multiple sensors of the same or different types may be used. In one example, the sensor 206 may be configured to support multicast streaming of the sensor data to the commissioning computer 202 and the field device 208. Alternately, after commissioning and deployment, a sensor cable may be disconnected from the commissioning computer 202 and plugged into the field device 208.

Broadly, the AI pipeline solution executed via the commissioning computer 202 comprises iteratively performing the steps of: data collection (including data labeling) based on sensor data captured by the sensor 206 positioned within the physical environment 204 where inspection is to be carried out, training an AI model (algorithm) using the collected data samples, optionally converting the AI model to a format supported by the field device 208, testing the trained (and, if applicable, converted) AI model by feeding it with real-time sensor data captured by the sensor 206 positioned within the same physical environment 204, and re-training the AI model based on the results of testing. Each iteration or loop is carried out using a different fixed setting of the sensor 206. That is, the setting of the sensor 206 is unchanged during the execution of a single iteration or loop. The iterative process is used to determine a final fixed setting of the sensor 206 for which a defined success criterion is achieved during testing. Each fixed setting of the sensor 206 may be defined by a combination of internal sensor settings and/or arrangements of the sensor 206 in relation to the physical environment 204. After successful training and testing, the AI model is deployed to the field device 208. After this point, the field device 208 is coupled to the sensor 206 configured with the final fixed setting to provide sensor data as input to the deployed AI model, for example for carrying out product inspection/fault classification.

The data collection step involves collecting a plurality of data samples by providing an operator interface for a field operator (e.g., a field engineer) to access sensor data pertaining to individual items in the production/assembly line and thereto assign classification labels. The collected data samples correspond to a fixed setting of the sensor 206.

Still referring to FIG. 2, in the described embodiment, the operator interface of the commissioning computer 202 comprises a sensor data viewer 210 that displays live sensor data to the field operator. In the present example, the sensor data viewer 210 may include a camera viewer displaying a live video stream representing a dynamic physical environment where inspection is to be carried out (e.g., a sequence of items moving along a production/assembly line). Based on the live sensor data, a field operator may evaluate images pertaining to individual items and carry out sensor setting adjustments 212, so that the collected sensor data is satisfactory in terms of quality and relevance. In the present embodiment, the sensor 206 includes a vision camera. In this case, the settings of the camera 206 that may be adjusted include the internal settings of the camera 206, such as focus (lens), brightness, contrast, saturation, shutter speed, ISO, aperture, etc., and/or the arrangement of the camera 206 in relation to the physical environment 204, such as lighting, camera placement, angle of view (mounting brackets and angles), etc. These settings may be tuned for the particular item on the particular production/assembly line, so that the collected images may reveal the most relevant features in the same physical environment. In another embodiment, where the sensor 206 includes a microphone, the settings of the microphone that may be adjusted may include internal settings of the microphone, such as gain, sampling rate, frequency filters, etc., and/or the arrangement of the microphone in relation to the physical environment, such as mounting location and direction where the microphone points to. After a satisfactory sensor setting adjustment 212 has been determined by the field operator, the settings of the sensor 206 are maintained unchanged throughout a particular cycle of the data collection, training and testing processes.

The operator interface of the commissioning computer 202 may further include a data labeling user interface (UI) 214 to provide live sensor data to field operators for them to label the data after the sensor setting has been fixed. In the described embodiment, the data labeling UI 214 may comprise a frame grabber for capturing a still image from the live video stream. For labeling the captured image, the data labeling UI 214 may enable the field operator to localize an identified fault or defect by drawing a bounding box around a region of interest in the captured image. The field operator may use domain expertise to assign a fault classification label to the captured image of an item. Fault classification labels may be binary (e.g., good versus faulty) or include multiple labels (e.g., Class 0—indicating that the item is good or defect-free; Class 1—indicating improper alignment of sub-part A and sub-part B; Class 2—indicating incomplete insertion of sub-part C into sub-part D; etc.). The data labeling UI 214 may enable the field operator to enter the label associated with a captured image in a standard format, such as text, html, etc. Each captured image with its bounding box and corresponding label is saved as one labeled data sample 216. In examples, a labeled data sample 216 may have one or more labels associated with one or more bounding boxes in the captured image. As mentioned, the training of an AI model on a specific use case involving repetitive inspection of similar items in a controlled environment requires significantly reduced number of data samples. For example, a few hundred data samples may be sufficient as long they cover most of the lighting variations in the factory, which is minimal in an indoor environment. Accordingly, the labeled data samples 216 obtained by the data collection process may be stored directly in a local storage medium of the commissioning computer 202, obviating the need to transfer data outside of the facility (i.e., no cloud connections are needed).

Once a sufficiently large number of labeled data samples 216 have been collected, the commissioning computer 202 provides the field operator the option to train an AI model, typically a neural network, via a training pipeline 218. In the commissioning phase, a pre-trained AI model is used, wherein the iterative training and testing via the commissioning computer 202 is carried out to tune the pre-trained AI model to the particular sensor 206 and the particular physical environment 204. The result of the training process is a trained AI model 220 configured to predict classification labels from input sensor data from the sensor 206. The commissioning computer 202 may provide a training monitoring interface, allowing the operator to monitor the training process and determine when to stop the training process. The training process may be stopped, for example, when a total loss function drops below a defined threshold. In embodiments, the commissioning computer 202 may be equipped with sufficient computational resources, such as one or more graphics processing units (GPU), for training the neural network efficiently. In an exemplary assembly line use case, it may take a state-of-the-art GPU about 1-2 hours to train a neural network (e.g., Tiny-YOLO) using about 200-300 labeled data samples with reasonable accuracy to detect product defects.

In some embodiments, the trained AI model may be converted (block 222) to a format compatible with the field device 208 prior to testing. For example, if the field device 208 comprises a NPU chip, then the trained AI model may be converted into a supported NPU format (e.g., a NPU chip manufactured by Intel™ is compatible with OpenVino™ framework). Model conversion improves the reliability of the model testing by ensuring that the AI model is tested using the commissioning computer 202 in the exact format that it is subsequently executed by the field device 208.

The trained (and converted) AI model may be tested (block 224) by launching the inference engine of the AI model on the commissioning computer 202 and feeding the AI model with real-time sensor data captured by the sensor 206 positioned within the same physical environment 204 and with the same fixed setting as during data collection. A test result is said to be satisfactory if an inference (e.g., predicted bounding box with classification label) produced by the AI model to an input image agrees with the field operator/domain expert. One or more success criteria may be defined to determine if re-training of the AI model is necessary. Examples of success criteria may include, for example, success rate (percentage of correct inferences), confidence levels of the inferences, etc. The test results may be monitored for a predetermined number of samples (e.g., 10-50 samples) to make a determination on whether re-training is necessary. If the defined success criteria are not met, a subsequent iteration of data collection, training and testing is carried out with a different sensor setting as explained in connection with block 212. Additionally, the re-training process may include modifying the data labeling method, for example, how the bounding boxes are drawn on the images to label the data samples. After iteratively re-training the AI model, a final fixed setting of the sensor 206 is determined which produces satisfactory test results based on the defined success criteria. The instant and on-the-spot feedbacks enables the field operator to re-train and tune the AI model within a very short time (e.g., on the same day) to provide a usable solution.

Once the test results are satisfactory (i.e., meet the success criteria), the AI model is deployed to the field device 208. At this point, the commissioning computer 202 can be disconnected from the setup. After deployment, the configuration of the sensor 206 is maintained at the final setting determined during the commissioning phase. The trained AI model is intended to be deployed in the same physical environment with the same environmental setting (e.g., lighting) as in the commissioning phase. For deployment to a different production line (e.g., with different lighting), the commissioning computer 202 may be used to train another AI model for that specific environment. Given that it is possible retrain and redeploy the model quickly, this is still a more efficient solution than going via the long loop illustrated in FIG. 1

FIG. 3 illustrates an exemplary computing environment comprising a computing system 302, within which aspects of the present disclosure may be implemented. The computing system 302 may be used, for example, to realize the commissioning computer 202. Computers and computing environments, such as computing system 302 and computing environment 300, are known to those of skill in the art and thus are described briefly here.

As shown in FIG. 3, the computing system 302 may include a communication mechanism such as a system bus 304 or other communication mechanism for communicating information within the computing system 302. The computing system 302 further includes one or more processors 306 coupled with the system bus 304 for processing the information. The processors 306 may include one or more central processing units (CPUs), graphical processing units (GPUs), or any other processor known in the art.

The computing system 302 also includes a system memory 308 coupled to the system bus 304 for storing information and instructions to be executed by processors 306. The system memory 308 may include computer readable storage media in the form of volatile and/or nonvolatile memory, such as read only memory (ROM) 310 and/or random access memory (RAM) 312. The system memory RAM 312 may include other dynamic storage device(s) (e.g., dynamic RAM, static RAM, and synchronous DRAM). The system memory ROM 310 may include other static storage device(s) (e.g., programmable ROM, erasable PROM, and electrically erasable PROM). In addition, the system memory 308 may be used for storing temporary variables or other intermediate information during the execution of instructions by the processors 306. A basic input/output system 314 (BIOS) containing the basic routines that help to transfer information between elements within computing system 302, such as during start-up, may be stored in system memory ROM 310. System memory RAM 312 may contain data and/or program modules that are immediately accessible to and/or presently being operated on by the processors 306. System memory 308 may additionally include, for example, operating system 316, application programs 318, other program modules 320 and program data 322.

The computing system 302 also includes a disk controller 324 coupled to the system bus 304 to control one or more storage devices for storing information and instructions, such as a magnetic hard disk 326 and a removable media drive 328 (e.g., floppy disk drive, compact disc drive, tape drive, and/or solid state drive). The storage devices may be added to the computing system 302 using an appropriate device interface (e.g., a small computer system interface (SCSI), integrated device electronics (IDE), Universal Serial Bus (USB), or FireWire).

The computing system 302 may also include a display controller 330 coupled to the system bus 304 to control a display 332, such as a cathode ray tube (CRT) or liquid crystal display (LCD), among other, for displaying information to a computer user. The computing system 302 includes a user input interface 334 and one or more input devices, such as a keyboard 336 and a pointing device 338, for interacting with a computer user and providing information to the one or more processors 306. The pointing device 338, for example, may be a mouse, a light pen, a trackball, or a pointing stick for communicating direction information and command selections to the one or more processors 306 and for controlling cursor movement on the display 332. The display 332 may provide a touch screen interface which allows input to supplement or replace the communication of direction information and command selections by the pointing device 338.

The computing system 302 also includes an I/O adapter 346 coupled to the system bus 304 to connect the computing system 302 to a controllable physical device, such as a robot. In the example shown in FIG. 3, the I/O adapter 346 is connected to one or more sensors 348, for example, including a video camera, a microphone, a vibration sensor, or combinations thereof.

The computing system 302 may perform a portion or all of the processing steps of embodiments of the disclosure in response to the one or more processors 306 executing one or more sequences of one or more instructions contained in a memory, such as the system memory 308. Such instructions may be read into the system memory 308 from another computer readable storage medium, such as a magnetic hard disk 326 or a removable media drive 328. The magnetic hard disk 326 may contain one or more datastores and data files used by embodiments of the present disclosure. Datastore contents and data files may be encrypted to improve security. The processors 306 may also be employed in a multi-processing arrangement to execute the one or more sequences of instructions contained in system memory 308. In alternative embodiments, hard-wired circuitry may be used in place of or in combination with software instructions. Thus, embodiments are not limited to any specific combination of hardware circuitry and software.

The computing system 302 may include at least one computer readable storage medium or memory for holding instructions programmed according to embodiments of the disclosure and for containing data structures, tables, records, or other data described herein. The term "computer readable storage medium" as used herein refers to any medium that participates in providing instructions to the one or more processors 306 for execution. A computer readable storage medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 326 or removable media drive 328. Non-limiting examples of volatile media include dynamic memory, such as system memory 308. Non-limiting examples of transmission media include coaxial cables, copper wire, and fiber optics, including the wires that make up the system bus 304. Transmission media may also take the form of acoustic or light waves, such as those generated during radio wave and infrared data communications.

The computing environment 300 may further include the computing system 302 operating in a networked environment using logical connections to one or more remote computers, such as remote computing device 344. Remote computing device 344 may be a personal computer (laptop or desktop), a mobile device, a server, a router, a network PC, a peer device or other common network node, and typically includes many or all of the elements described above relative to computing system 302. When used in a networking environment, computing system 302 may include a modem 342 for establishing communications over a network 340, such as the Internet. Modem 342 may be connected to system bus 304 via network interface 345, or via another appropriate mechanism.

Network 340 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computing system 302 and other computers (e.g., remote computing device 344). The network 340 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 340.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A method for commissioning an artificial intelligence (AI) based inspection system, comprising:

(i) receiving, by a commissioning computer, sensor data captured by a sensor, the sensor positioned within a physical environment to capture sensor data pertaining to individual items in a sequence of similar items, (ii) collecting, by the commissioning computer, a plurality of data samples, wherein collecting each data sample comprises providing an operator interface for a field operator to access sensor data pertaining to individual items and thereto assign classification labels, the collected data samples corresponding to a fixed setting of the sensor, (iii) training, by the commissioning computer, an AI algorithm using the collected data samples to configure the AI algorithm to predict classification labels from input sensor data, (iv) testing, by the commissioning computer, the trained AI algorithm by feeding the trained AI algorithm with real-time sensor data captured by the sensor positioned within said physical environment with said fixed setting, wherein steps (ii) through (iv) are performed iteratively using different fixed settings of the sensor, to determine a final setting of the sensor for which a defined success criterion is achieved during the testing, and (v) deploying the iteratively trained and tested AI algorithm to a field device, the field device being coupled to the sensor configured with the final setting to provide sensor data as input to the deployed AI algorithm.

2. The method according to claim 1, wherein the physical environment comprises a production line or an assembly line.

3. The method according to claim 1, wherein the AI algorithm is pre-trained prior to training by the commissioning computer, wherein the iterative training and testing via the commissioning computer is carried out to tune the pre-trained AI algorithm to said sensor and said physical environment.

4. The method according to a claim 1, wherein each fixed setting of the sensor is defined by a combination of internal sensor settings and/or arrangements of the sensor in relation to the physical environment.

5. The method according to claim 1, wherein the sensor comprises a vision camera capable of transmitting captured sensor data as a video stream to the commissioning computer and to the field device.

6. The method according to claim 5, wherein the operator interface comprises a camera viewer configured to display live sensor data to the field operator, the method further comprising adjusting a current setting of the sensor by the field operator based on the displayed live sensor data prior to collection of the data samples.

7. The method according to claim 5, wherein the operator interface comprises a frame grabber for capturing a still image from the video stream, the operator interface configured to enable the field operator to draw a bounding box around a region of interest in the captured image and label the captured image.

8. The method according to claim 1, wherein the sensor comprises an acoustic sensor capable of transmitting captured sensor data as an audio stream to the commissioning computer and to the field device.

9. The method according to claim 1, wherein the sensor comprises a vibration sensor.

10. The method according to claim 1, comprising storing the collected data samples in a local storage medium of the commissioning computer.

11. The method according to claim 1, wherein the training and the testing of the AI algorithm is carried out via a graphics processing unit (GPU) of the commissioning computer.

12. The method according to claim 1, further comprising converting the trained AI algorithm, by the commissioning computer, into a format compatible with the field device, such that the testing by the commissioning computer is carried out on the converted format of the AI algorithm.

13. The method according to claim 1, wherein the field device comprises a neural processing unit (NPU).

14. A non-transitory computer-readable storage medium including instructions that, when processed by a computing device, configure the computing device to perform the method according to claim 1.

15. A computing device for commissioning an artificial intelligence (AI) based inspection system, comprising:

a processor; and a memory storing instructions that, when executed by the processor, cause the computing device to:

(i) receive sensor data captured by a sensor, the sensor positioned within a physical environment to capture sensor data pertaining to individual items in a sequence of similar items, (ii) collect a plurality of data samples, wherein collecting each data sample comprises providing an operator interface for a field operator to access sensor data pertaining each individual item and thereto assign a classification label, the collected data samples corresponding to a fixed setting of the sensor, (iii) train an AI algorithm using the collected data samples to configure the AI algorithm to predict classification labels from input sensor data, (iv) test the trained AI algorithm by feeding the trained AI algorithm with real-time sensor data captured by the sensor positioned within said physical environment with said fixed setting, wherein steps (ii) through (iv) are performed iteratively using different fixed settings of the sensor, to determine a final setting of the sensor for which a defined success criterion is achieved during the testing, and (v) deploy the iteratively trained and tested AI algorithm to a field device, the field device being coupled to the sensor configured with the final setting to provide sensor data as input to the deployed AI algorithm.

* * * * *